(12) United States Patent
Cao et al.

(10) Patent No.: US 8,838,916 B2
(45) Date of Patent: Sep. 16, 2014

(54) HYBRID DATA STORAGE MANAGEMENT TAKING INTO ACCOUNT INPUT/OUTPUT (I/O) PRIORITY

(75) Inventors: Mingming Cao, Portland, OR (US); Ben Chociej, Kansas City, MO (US); Scott R. Conor, Blacksburg, VA (US); Steven M. French, Austin, TX (US); Matthew R. Lupfer, Boulder, CO (US); Steven L. Pratt, Leander, TX (US)

(73) Assignee: International Business Machines Corporation, Armonk, NY (US)

( * ) Notice: Subject to any disclaimer, the term of this patent is extended or adjusted under 35 U.S.C. 154(b) by 100 days.

(21) Appl. No.: 13/233,266

(22) Filed: Sep. 15, 2011

(65) Prior Publication Data
US 2013/0073783 A1    Mar. 21, 2013

(51) Int. Cl.
*G06F 12/08*    (2006.01)
*G06F 3/06*    (2006.01)

(52) U.S. Cl.
CPC ............ *G06F 3/0611* (2013.01); *G06F 3/0685* (2013.01); *G06F 3/0649* (2013.01)
USPC .................... 711/158; 711/103; 711/E12.008; 711/E12.016

(58) Field of Classification Search
None
See application file for complete search history.

(56) References Cited

U.S. PATENT DOCUMENTS

| | | | |
|---|---|---|---|
| 7,581,061 B2 | 8/2009 | Miyagaki et al. | |
| 2009/0049234 A1 | 2/2009 | Oh et al. | |
| 2010/0199036 A1 | 8/2010 | Siewart et al. | |
| 2010/0250834 A1 | 9/2010 | Trika et al. | |
| 2010/0281230 A1 | 11/2010 | Rabii et al. | |
| 2010/0306493 A1 | 12/2010 | Carrillo et al. | |
| 2011/0010519 A1 | 1/2011 | Cobley | |
| 2011/0173395 A1* | 7/2011 | Bhattacharjee et al. | 711/135 |
| 2012/0297122 A1* | 11/2012 | Gorobets et al. | 711/103 |

FOREIGN PATENT DOCUMENTS

JP    2009048613 A    3/2009

OTHER PUBLICATIONS

Park et al., "PRAM and NAND Flash Hybrid Architecture Based on Hot Data Detection", 2010 2nd International Conference on Mechanical and Electronics Engineering (ICMEE 2010), vol. 1, pp. VI-93-VI-97, Aug. 1-3, 2010.
Chociej et al., "Btrfs: Add hot data tracking functionality", LWN.net. Jul. 27, 2010.

* cited by examiner

*Primary Examiner* — Charles Rones
*Assistant Examiner* — Ryan Dare
(74) *Attorney, Agent, or Firm* — Yee & Associates, P.C.; Parashos Kalaitzis (57) ABSTRACT

A method uses a record of I/O priorities in a determination of a storage medium of a hybrid storage system in which to store a file. The method maintains the record of I/O priorities by assigning an I/O temperature value to each request for access to the file based upon an I/O priority level of the process making the request. The method marks the file as hot if the file temperature value is greater than a threshold value. The method stores files marked as hot in a lower latency storage medium of the hybrid storage medium.

12 Claims, 5 Drawing Sheets

| FILE | ACCESS COUNT | ACCESS FREQUENCY | LAST ACCESS | AVERAGE I/O PRIORITY VALUE | TEMPERATURE | HOT/COLD |
|---|---|---|---|---|---|---|
| ... | ... | ... | ... | ... | ... | ... |

FIG. 1

| IONICE SCHEDULING CLASS | SCHEDULING CLASS DATA | I/O PRIORITY TEMPERATURE VALUE |
|---|---|---|
| IDLE | -- | -3 |
| BEST EFFORTS | 0-7 | 0 |
| REAL TIME | 0-7 | 3 |

FIG. 2

| FILE ~301 | ACCESS COUNT ~305 | ACCESS FREQUENCY ~307 | LAST ACCESS ~309 | AVERAGE I/O PRIORITY VALUE ~311 | TEMPERATURE ~313 | HOT/COLD ~315 |
|---|---|---|---|---|---|---|
| ... | ... | ... | ... | ... | ... | ... |

FIG. 7

HYBRID DATA STORAGE MANAGEMENT TAKING INTO ACCOUNT INPUT/OUTPUT (I/O) PRIORITY

BACKGROUND

The present invention relates generally to the field of hybrid data storage management, and more particular to methods, systems and computer program products that consider input/output (I/O) priority in determining the allocation data between hard disk drives (HDDs) and solid state drives (SSDs) in hybrid data storage systems.

Traditional hard disk drives (HDDs) are relatively inexpensive and they have the capacity to store very large amounts of data. However, the performance of HDDs in terms of input/output (I/O) speed has fallen significantly behind the speed of central processing units and various system buses. Accordingly, the transfer of data to and from hard disk drives presents a significant bottleneck to overall computer system performance.

Modern solid state drives (SSDs) provide high speed nonvolatile storage, but their cost per unit of storage capacity is substantially higher than that of HDDs. Accordingly, it is not cost effective to replace HDDs with SSDs. However, there have been developed hybrid storage systems, which comprise a combination of HDDs and SSDs. In hybrid storage systems most of the data is stored in the HDD part of the system while a subset of the data is stored in the SSD part of the system.

Current hybrid storage caching techniques make their determination of where to store the data based on how often a particular file is accessed. Less frequently accessed data, which is referred to as cold data, is stored in the HDD part of the hybrid storage system, while more frequently accessed data, which is referred to as hot data, is cached in the SSD part of the system. However, there can be contention among files for the designation of hot data and there can be thrashing over time as files are moved into and out of the SSD based data access frequency. Moreover, hotter data in terms of frequency of access may not be more important data or data that requires the fastest response times.

BRIEF SUMMARY

Embodiments of the present invention provide methods, systems, and computer program products for allocating files between a lower latency storage medium and a higher latency storage medium in a hybrid storage system. In one embodiment, a method maintains a record of I/O priorities for processes requesting access to a file in the hybrid storage system. The method uses the record of I/O priorities in a determination of a storage medium of the hybrid storage system in which to store the file. In some embodiments, the method maintains the record of I/O priorities by assigning an I/O temperature value to each request for access to the file based upon an I/O priority level of the process making the request. The method averages the I/O temperature values over the requests for access to the file.

The method maintains, in addition to record of I/O priorities for processes requesting access to the file, a record of a number of requests to access the file, and uses the number of requests to access the file in the determination of the storage medium in which to store the file. The method uses the record of the number of requests to access the file in determining an access temperature value for the file. The method combines the average I/O temperature value with the access temperature value to obtain a file temperature value. The method marks the file as hot if the file temperature value is greater than a threshold value. The method stores files marked as hot in the lower latency storage medium.

BRIEF DESCRIPTION OF THE SEVERAL VIEWS OF THE DRAWINGS

The novel features believed characteristic of the invention are set forth in the appended claims. The invention itself, however, as well as a preferred mode of use, further purposes and advantages thereof, will best be understood by reference to the following detailed description of an illustrative embodiment when read in conjunction with the accompanying drawings, where:

DETAILED DESCRIPTION

Figure 1:
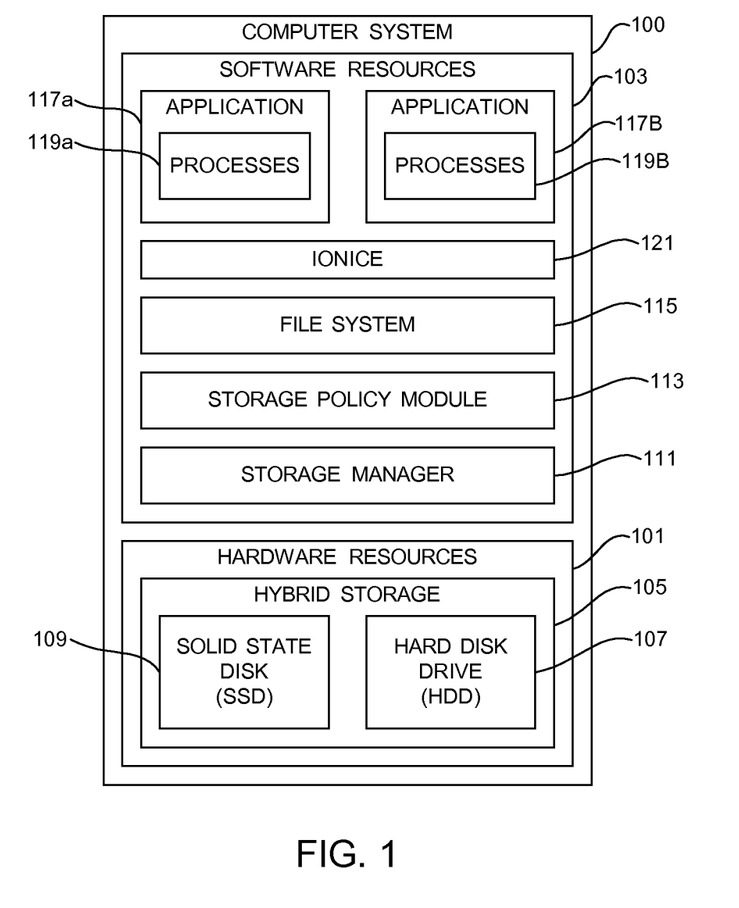
FIG. 1 is a block diagram of an embodiment of a system according to the present invention.

Referring now to the drawings, and first to FIG. 1, a computer system is designated generally by the numeral 100. Computer system 100 includes hardware resources, designated generally by the number 101, and software resources, designated generally by the numeral 103. Hardware resources 101 include, among other components, a hybrid storage system 105. Hybrid storage system 105 includes at least one hard disk drive (HDD) 107 and a solid state disk (SSD) 109. SSD 109 may include NAND-based flash memory.

Software resources 103 include a storage manager 111, which accesses data stored in hybrid storage system 105 and moves data between HHD 107 and SSD 109. A storage policy module 113 is programmed according to embodiments of the present invention to determine whether to instruct storage manager 111 to store data files in HDD 107 or in SSD 109. Storage policy module 113 monitors a file system 115, which organizes data stored in hybrid storage 105 in a hierarchical system of files.

Software resources 103 include one or more applications 117. Each application 117 includes a plurality of processes, indicated generally by the numeral 119. Processes 119 use data stored in hybrid storage 105 to perform the work of applications 117.

Software resources 103 include an IONICE 121 component. IONICE 121 is a program that sets the I/O scheduling priority for access to hybrid storage 105 for processes 119. IONICE currently supports three scheduling classes: idle; best effort; and real time. A process with idle I/O priority will have access to hybrid storage 105 only when no other process has requested access to hybrid storage 105 within a specified time period. Processes having idle I/O priority should therefore have no impact on normal system availability.

Best effort I/O priority is the default scheduling class for any process that has not been assigned a specific scheduling class. The best effort I/O priority scheduling class includes scheduling class data, which is a separate priority argument from 0 to 7, the lower the number, the higher the priority. Processes running at the same best efforts I/O priority are served in round-robin fashion.

Processes in the real time I/O priority scheduling class are given first access to hybrid storage 105. The real time I/O priority scheduling class also includes eight levels of scheduling class data. Again, real time I/O priority data priority arguments are from 0 to 7, with the lower numbers indicating higher priority within the scheduling class.

According to embodiments of the present invention, and as will described in detail hereinafter, storage policy module 113 collects data on the each file accessed including the number of accesses and the I/O priority of processes accessing the file in order to determine a temperature value for each file. Files with a temperature greater than a threshold value are deemed to be hot, whereas files with a temperature less than the threshold value are deemed to be cold. Storage manager 111 stores hot files in lower latency SSD 109 and cold files in higher latency HDD 107.

Some files may be very large and may be larger than the capacity of SSD 109. Processes may access only ranges of files rather than entire files. Accordingly, for purposes of this disclosure, the term files shall include shall include ranges of files in addition to entire files.

Figure 2:
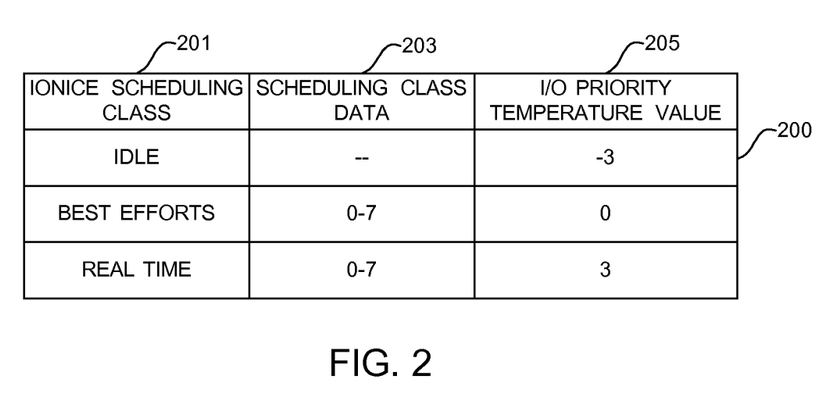
FIG. 2 is a pictorial view of an embodiment of an IONICE I/O priority temperature table according to the present invention.

FIG. 2 is an example of an embodiment of a table 200 that maps IONICE scheduling class 201 and scheduling class data 203 to I/O priority temperature value 205 according to the present invention. In table 200, file accesses by processes having an idle scheduling class are assigned an I/O priority temperature value of −3. File accesses by processes having a best effort scheduling class are assigned an I/O priority temperature value of 0, regardless of the process's scheduling class data argument. File accesses by processes having a real time scheduling class are assigned an I/O priority temperature value of +3, again regardless of the process's scheduling class data argument. The assignment of I/O priority temperature values to IONICE scheduling classes is tunable by a system administrator, and the mapping of table 200 is only an example. Also, greater granularity may be achieved by assigning separate I/O priority temperature values to individual or more finely grouped arguments with a scheduling class.

Figure 3:
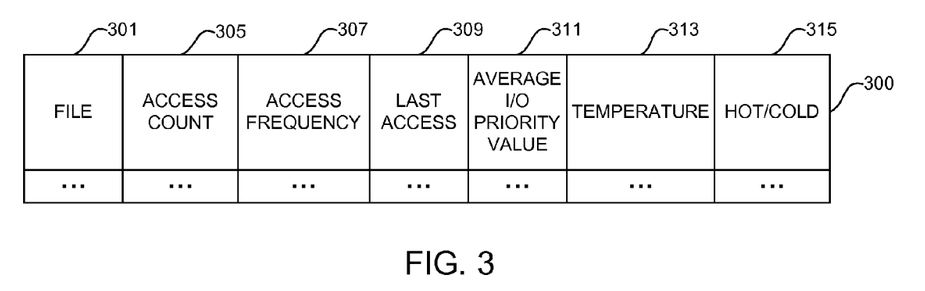
FIG. 3 is a pictorial view of an embodiment of a temperature record table according to the present invention.

FIG. 3 is an example of an embodiment of a temperature record table 300 according to the present invention. The system maintains for each file 301 accessed an access count 303. Access count 303 is the number of reads and writes of the file over a particular time period. The system also maintains for each file 301 accessed an access frequency 305, which is the number of reads and/or writes of the file per unit of time. The system may also maintain for each file accessed a last access 307, which is the time since the file was last accessed. The system finally maintains for each file accessed the average I/O priority temperature value 309 for the processes accessing the file. The system combines average I/O priority temperature 309 with one or more of access count 303, access frequency 305, and last access 307, to obtain a temperature 311 for the file. In one embodiment, temperature 311 may be obtained using an equation of the form:

$$T = W_C AC + W_F AF + W_L LA + W_P P$$

Where:
T=file temperature;
$W_C$=an access count weight factor;
AC=access count;
$W_F$=an access frequency weight factor;
AF=access frequency;
$W_L$=a last access weight factor;
LA=time since last access;
$W_P$=an average I/O priority temperature weight factor; and,
P=average I/O priority temperature.

After having computed the temperature of a file, the system compares the computed temperature to a predetermined threshold value to determine of the file is hot or cold, with determination being recorded in column 313. Hot files are stored in SSD 109 and cold files are stored in HDD 107. An administrator may tune the foregoing weight factors and the threshold value so as to achieve an appropriate utilization of SSD 109.

In some embodiments, separate access temperature and priority temperature components may be determined and then combined into temperature value for the file. For example, access temperature may be calculated according to the following equation:

$$T_A = W_C AC + W_F AF + W_L LA$$

Where:
$T_A$=access temperature;
$W_C$=an access count weight factor;
AC=access count;
$W_F$=an access frequency weight factor;
AF=access frequency;
$W_L$=a last access weight factor; and,
LA=time since last access.

Priority temperature may be calculated according to the following equation:

$$T_P = W_P P$$

Where:
$T_P$=I/O priority temperature;
$W_P$=an average I/O priority temperature weight factor; and,
P=average I/O priority temperature.

Then, file temperature T is given by $T = T_A + T_P$.

Figure 4:
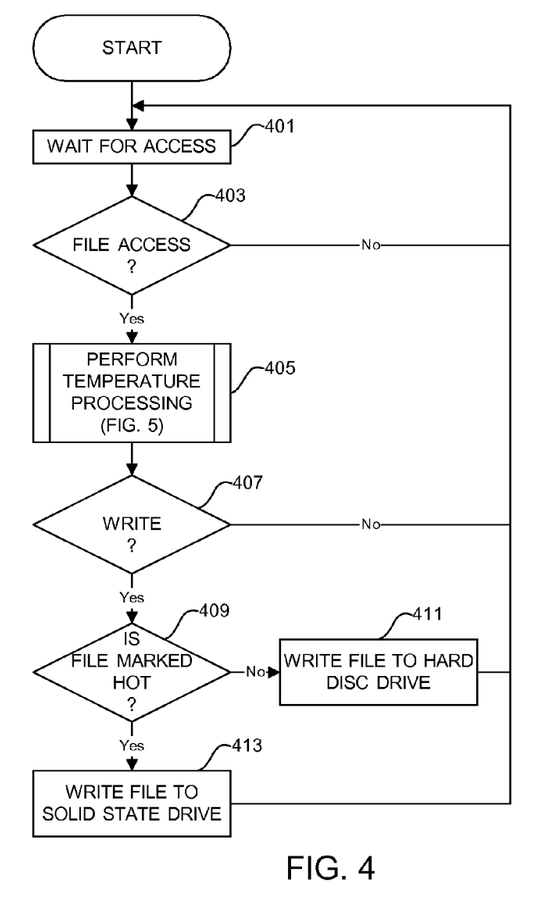
FIG. 4 is a flowchart of an embodiment run time file access processing according to the present invention.

FIG. 4 is a flowchart of an embodiment of storage policy module 113 processing according to the present invention. Storage policy module 113 waits for a file access at block 401. A file access may be either a read from or a write to hybrid storage 105. When, as determined at decision block 403, a file is accessed, the system performs temperature process, as indicated generally at block 403 and shown in detail in FIG. 5. After performing temperature processing, the system determines, at decision block 407, if the file access was a write to hybrid storage 105. If the file access was not a write, processing returns to block 401 to wait for another file access. If the file access was a write, the system refers to table 300 and determines, at decision block 409, if the file that was accessed is marked hot. If the file is not marked hot, the system writes the file to HDD 107, as indicated at block 411. If the is marked hot, the system writes the file to SSD 109, as indicated at block 413, and processing returns to block 401 to wait for another file access.

Figure 5:
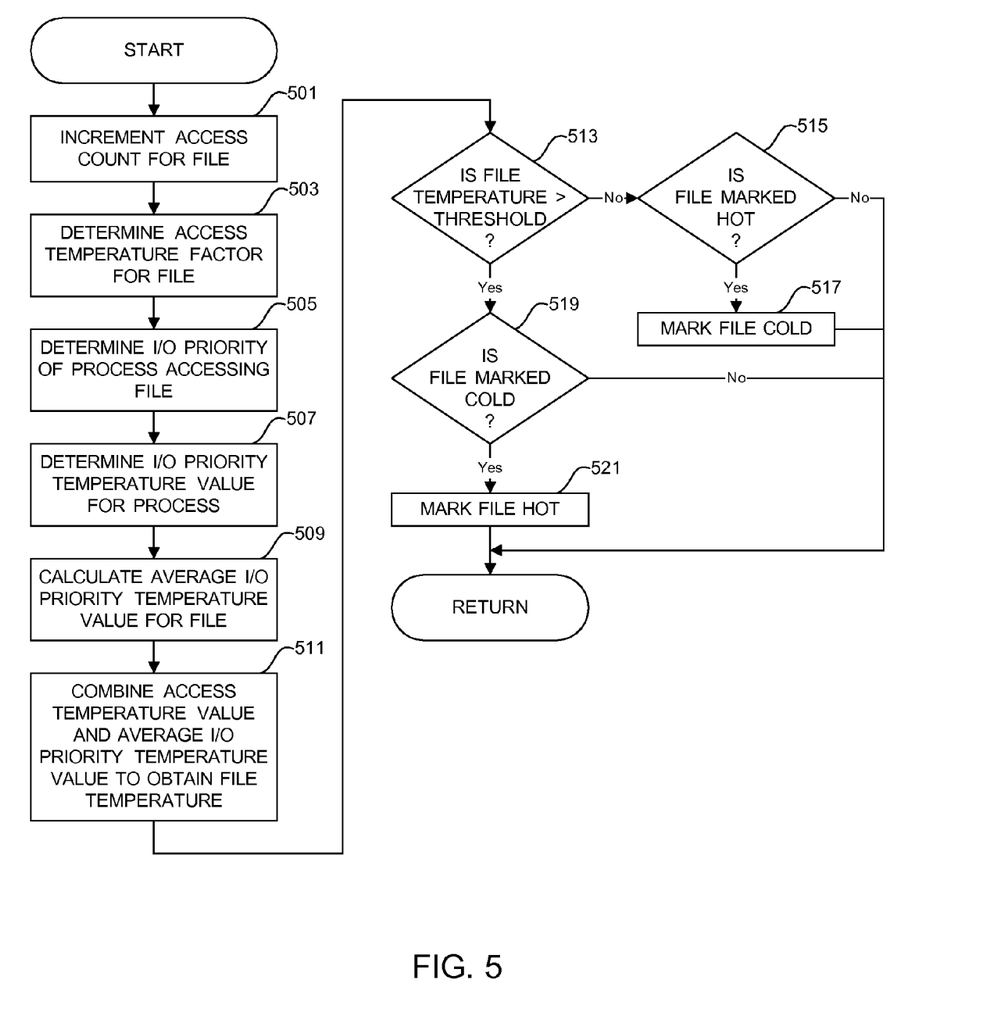
FIG. 5 is a flowchart of an embodiment of file temperature processing of FIG. 4.

Referring now to FIG. 5, there is shown a flowchart of temperature processing 413 of FIG. 4. The system increments the access count in table 300 for the file accessed, at block 501. Then, the system determines an access temperature for the file, at block 503. The system determines the I/O priority of the process accessing the file, at block 505, and the I/O priority temperate value for the process, at block 507, by referring to table 200, of FIG. 2. Then, the system calculates the average I/O priority temperature value for the file, at block 509. The system then combines the access temperature value and the average I/O priority temperature value to obtain the file temperature, at block 511.

The system determines, at decision block 513, if the file temperature is greater than a threshold temperature. If the file temperature is not greater than the threshold, the system determines, at decision block 515, if the file is marked hot in table 300. If the file is marked hot, the system marks the file cold, at block 517, and processing returns to FIG. 4. Returning to decision block 513, if the file temperature is greater than the threshold, the system determines, at decision block 519, if the file is marked cold in table 300. If the file is marked cold, the system marks the file hot, at block 521, and processing returns to FIG. 4.

Figure 6:
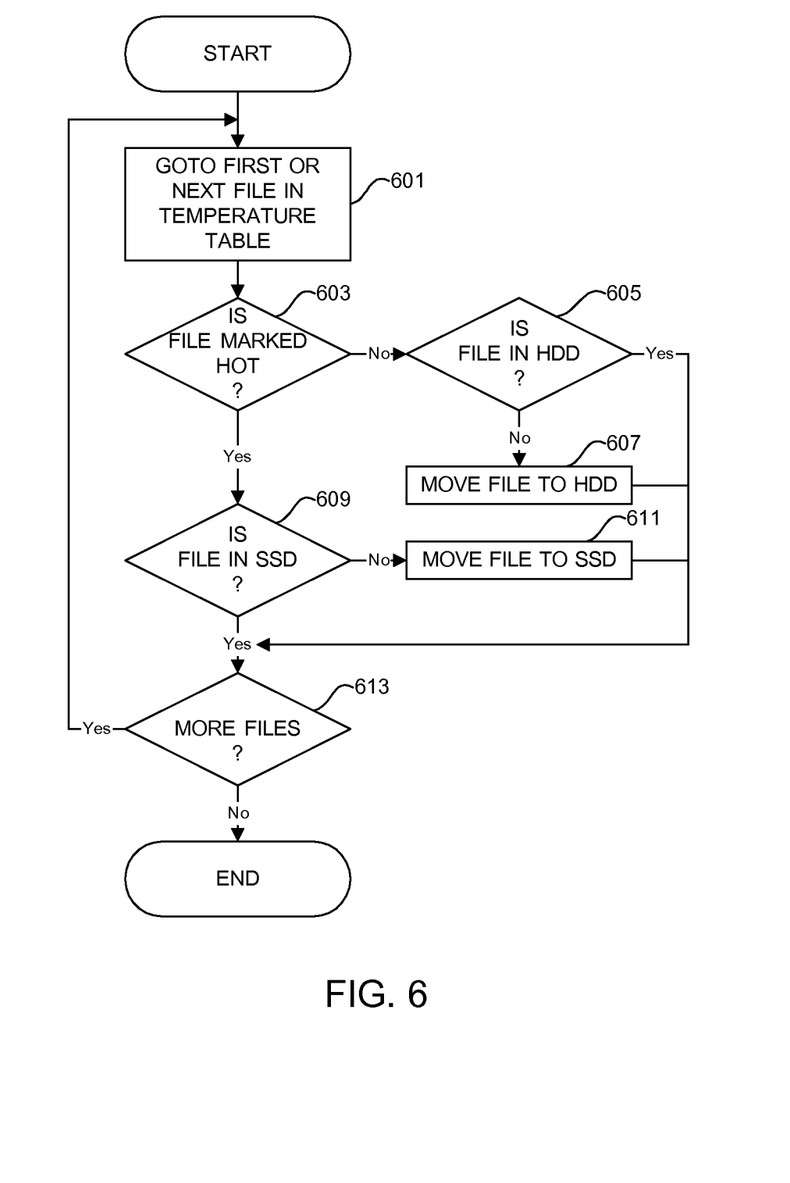
FIG. 6 is a flowchart of an embodiment of background file move processing according to the present invention; and, FIG. 7 is a block diagram of a computing device in which features of the present invention may be implemented.

FIG. 6 is a flowchart of an embodiment of a background process for moving files or ranges of files between HDD 107 and SSD 109. The system goes to the first or next file in temperature table 300, at block 601. If, as determined at decision block 603, the file is not marked hot, which means the file is marked cold, the system determines, at decision block 605, if the file is stored in HDD 107. If the file is not stored in HDD 107, the system moves the file to HDD 107, as indicated at block 607. Returning to decision block 603, if the file is marked hot, the system determines, at decision block 609, if the file is stored in SSD 109. If the file is not stored in SSD 109, the system moves the file to SDD 109, as indicated at block 611. Then, the system determines, at decision block 613, if there are more files in temperature table 300. If there are more files, the processing returns to block 601.

Figure 7:
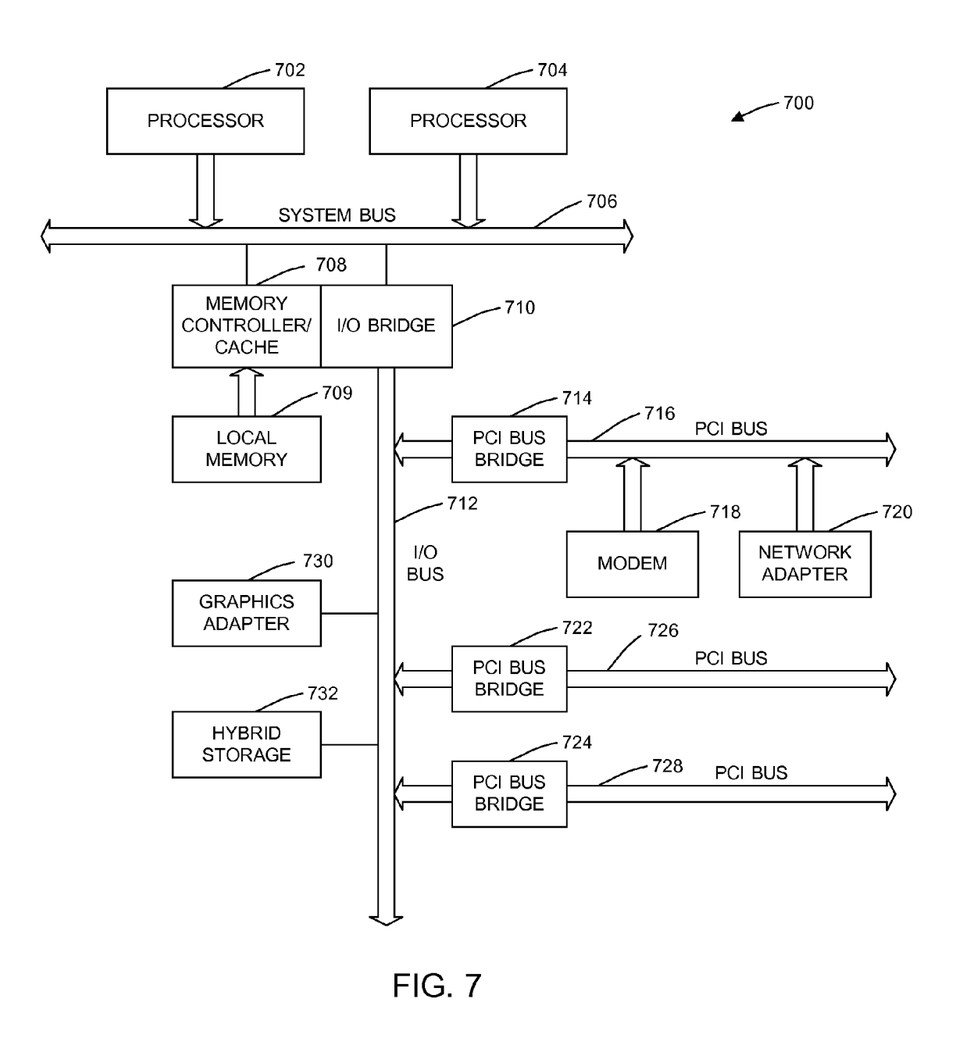

FIG. 7 is a block diagram of a data processing system upon which embodiments of the present invention may be implemented. Data processing system 700 may be a symmetric multiprocessor (SMP) system including a plurality of processors 702 and 704 connected to system bus 706. Alternatively, a single processor system may be employed. Also connected to system bus 706 is memory controller/cache 708, which provides an interface to local memory 709. I/O bus bridge 710 is connected to system bus 706 and provides an interface to I/O bus 712. Memory controller/cache 708 and I/O bus bridge 710 may be integrated as depicted.

Peripheral component interconnect (PCI) bus bridge 714 connected to I/O bus 712 provides an interface to PCI local bus 716. A number of modems may be connected to PCI local bus 716. Typical PCI bus implementations will support four PCI expansion slots or add-in connectors. Communications links to networks may be provided through a modem 718 or a network adapter 720 connected to PCI local bus 716 through add-in boards. Additional PCI bus bridges 722 and 724 provide interfaces for additional PCI local buses 726 and 728, respectively, from which additional modems or network adapters may be supported. In this manner, data processing system 700 allows connections to multiple network computers. A memory-mapped graphics adapter 730 and hybrid storage 732 may also be connected to I/O bus 712 as depicted, either directly or indirectly.

Those of ordinary skill in the art will appreciate that the hardware depicted in FIG. 7 may vary. For example, other peripheral devices, such as optical disk drives and the like, also may be used in addition to or in place of the hardware depicted. The depicted example is not meant to imply architectural limitations with respect to the present invention.

The data processing system depicted in FIG. 7 may be, for example, an IBM® eServer™ pSeries system, a product of International Business Machines Corporation in Armonk, N.Y., running the Advanced Interactive Executive (AIX™) operating system or LINUX operating system.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium or media having computer readable program code embodied thereon.

Any combination of one or more computer readable medium or media may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The computer program instructions comprising the program code for carrying out aspects of the present invention may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the foregoing flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the foregoing flowchart and/or block diagram block or blocks.

The flowcharts and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an", and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

From the foregoing, it will be apparent to those skilled in the art that systems and methods according to the present invention are well adapted to overcome the shortcomings of the prior art. While the present invention has been described with reference to presently preferred embodiments, those skilled in the art, given the benefit of the foregoing description, will recognize alternative embodiments. Accordingly, the foregoing description is intended for purposes of illustration and not of limitation.

What is claimed is:

1. A method, which comprises:
   maintaining a record of I/O priorities for processes requesting access to a file in a system including a hybrid storage system, said hybrid storage system including a lower latency storage medium and a higher latency storage medium;
   maintaining a record of a number of requests to access said file;
      said maintaining said record of I/O priorities comprises assigning an I/O temperature value to each request for access to said file based upon an I/O priority level of the process making the request, and averaging said I/O temperature values over said requests for access to said file; and
      said maintaining said record of said number of requests to access said file includes determining an access temperature value for said file; and
   determining a storage medium in which to store said file using said record of I/O priorities and said number of requests to access said file, wherein said determination of said storage medium in which to store said file includes combining said average I/O temperature value with said access temperature value to obtain a file temperature value.

2. The method as claimed in claim 1, wherein said determination of said storage medium in which to store said file includes marking said file as hot if said file temperature value is greater than a threshold value.

3. The method as claimed in claim 1, wherein said determination of said storage medium in which to store said file includes storing said file in said lower latency storage medium if said file temperature value is greater than a threshold value.

4. The method as claimed in claim 1, wherein said lower latency storage medium comprises a solid state drive and said higher latency storage medium comprises a hard disc drive.

5. The method of claim 1, wherein the file temperature is determined using the formula:

$$T = W_c AC + W_F AF + W_L LA + W_P P$$

Where:
   T=file temperature;
   $W_c$ =an access count weight factor;
   AC=access count;
   $W_F$ =an access frequency weight factor;
   AF=access frequency;
   $W_L$ =a last access weight factor;
   LA=time since last access;
   $W_P$ =an average I/O priority temperature weight factor; and,
   P=average I/O priority temperature.

6. A system, which comprises:
   a hybrid storage system including a first storage medium and a second storage medium;
   at least one processor;

memory coupled to said at least one processor and storing instructions, which when executed by said at least one processor cause said at least one processor to perform operations comprising:

maintaining a record of I/O priorities for processes requesting access to a file in said hybrid storage system; and, maintaining a record of a number of requests to access said file;

said maintaining said record of I/O priorities comprises assigning an I/O temperature value to each request for access to said file based upon an I/O priority level of the process making the request, and averaging said I/O temperature values over said requests for access to said file; and said maintaining said record of said number of requests to access said file includes determining an access temperature value for said file; and determining a storage medium in which to store said file using said record of I/O priorities and said number of requests to access said file, wherein said determination of said storage medium in which to store said file includes combining said average I/O temperature value with said access temperature value to obtain a file temperature value.

7. The system as claimed in claim 6, wherein said lower latency storage medium comprises a solid state drive and said higher latency storage medium comprises a hard disc drive.

8. The system of claim 6, wherein the file temperature is determined using the formula:

$$T=W_cAC+W_FAF+W_LLA+W_pP$$

Where:
T=file temperature;
$W_c$ =an access count weight factor;
AC=access count;
$W_F$ =an access frequency weight factor;
AF=access frequency;
$W_L$ =a last access weight factor;
LA=time since last access;
$W_p$ =an average I/O priority temperature weight factor; and,
P=average I/O priority temperature.

9. A non-transitory computer readable storage medium having a computer program product encoded thereon, said computer program product comprising:

instructions stored in said computer readable storage medium for maintaining a record of I/O priorities for processes requesting access to a file in a hybrid storage system, said hybrid storage system including a lower latency storage medium and a higher latency storage medium;

instructions stored in said computer readable storage medium for maintaining a record of a number of requests to access said file;

said maintaining said record of I/O priorities comprises assigning an I/O temperature value to each request for access to said file based upon an I/O priority level of the process making the request, and averaging said I/O temperature values over said requests for access to said file; and said maintaining said record of said number of requests to access said file includes determining an access temperature value for said file; and instructions stored in said computer readable storage medium for determining a storage medium in which to store said file using said record of I/O priorities and said number of requests to access said file, wherein said determination of said storage medium in which to store said file includes combining said average I/O temperature value with said access temperature value to obtain a file temperature value.

10. The non-transitory computer readable storage medium as claimed in claim 9, wherein said instructions for making said determination of said storage medium in which to store said file includes instructions stored in said computer readable storage medium for marking said file as hot if said file temperature value is greater than a threshold value.

11. The non-transitory computer readable storage medium as claimed in claim 9, wherein said instructions for making said determination of said storage medium in which to store said file includes instructions stored in said computer readable storage medium for storing said file in said lower latency storage medium if said file temperature value is greater than a threshold value.

12. The non-transitory computer readable storage medium of claim 9, wherein the file temperature is determined using the formula:

$$T=W_cAC+W_FAF+W_LLA+W_pP$$

Where:
T=file temperature;
$W_c$ =an access count weight factor;
AC=an access count;
$W_F$ =an access frequency weight factor;
AF=an access frequency;
$W_L$ =a last access weight factor;
LA=a time since last access;
$W_p$ =an average I/O priority temperature weight factor; and,
P=an average I/O priority temperature.

* * * * *